TOY TELEPHONE

Filed Dec. 19, 1968 4 Sheets-Sheet 1

INVENTORS
MARVIN I. GLASS
GORDON A. BARLOW
BY James F. Coffee
ATTORNEY

TOY TELEPHONE
Filed Dec. 19, 1968 4 Sheets-Sheet 2
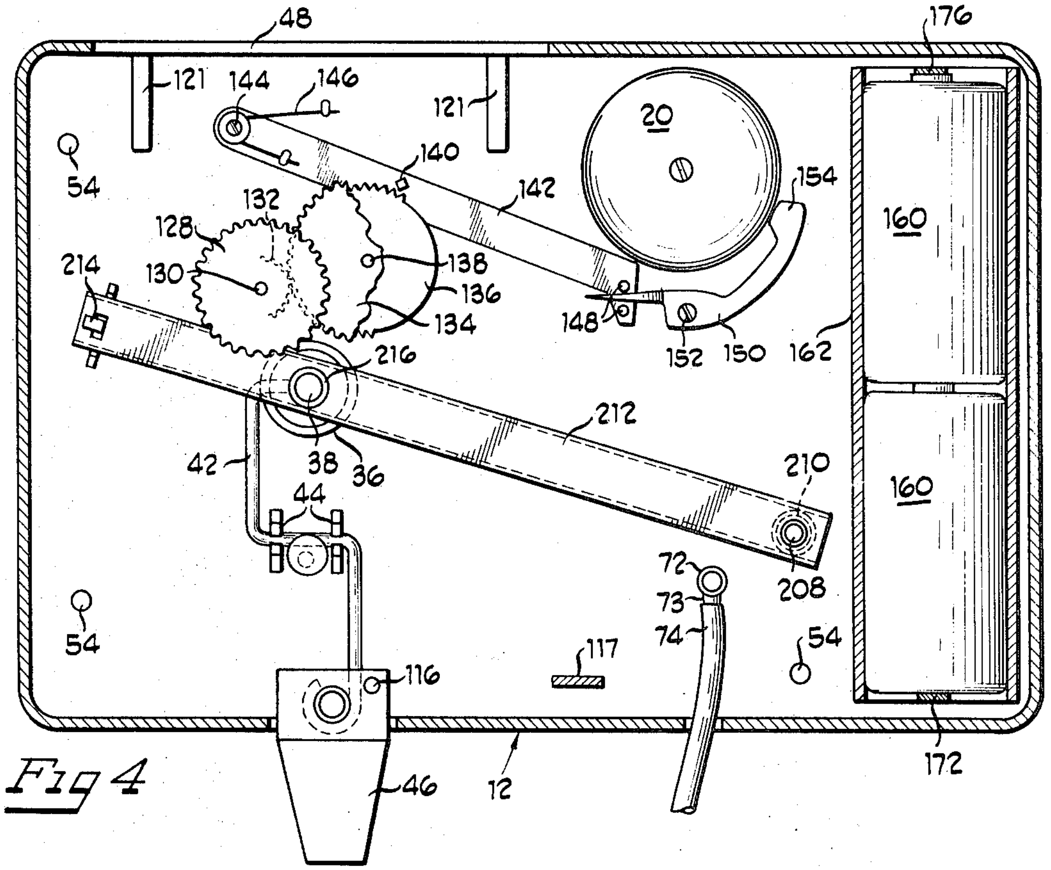
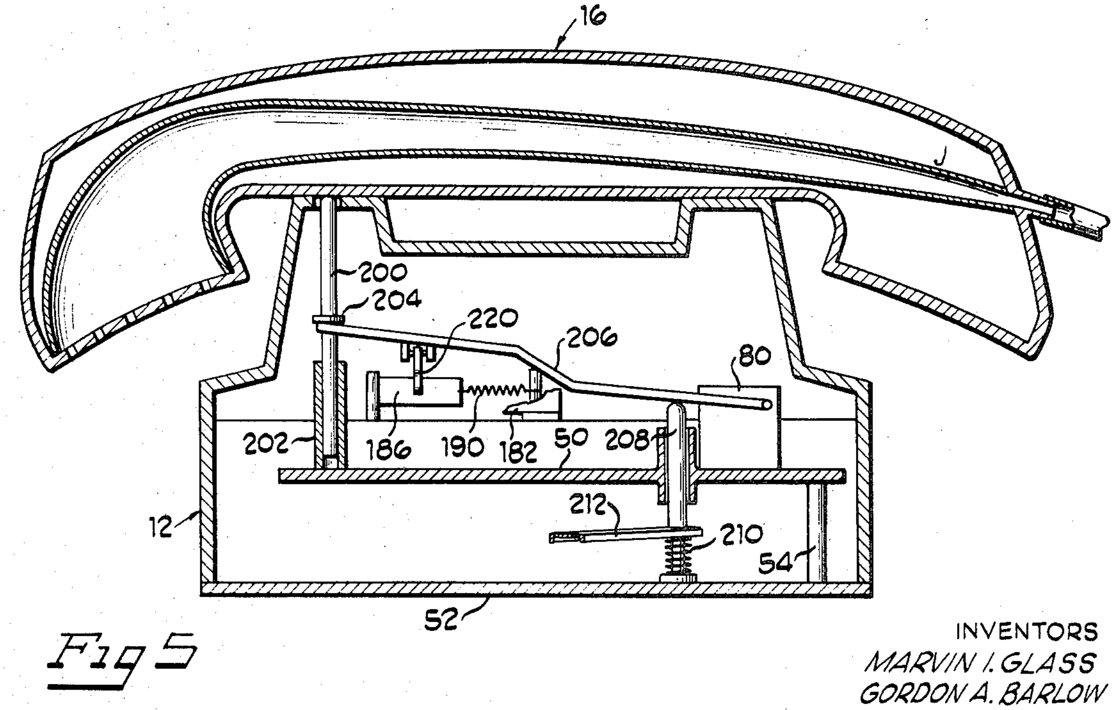
Fig 5
INVENTORS
MARVIN I. GLASS
GORDON A. BARLOW
BY James D. Coffee
ATTORNEY Dec. 22, 1970 M. I. GLASS ET AL 3,548,536

TOY TELEPHONE

Filed Dec. 19, 1968 4 Sheets-Sheet 3

INVENTORS
MARVIN I. GLASS
GORDON A. BARLOW

BY James V. Coffee
ATTORNEY

INVENTORS
MARVIN I. GLASS
GORDON A. BARLOW

BY James J. Coffee
ATTORNEY 3,548,536

TOY TELEPHONE

Marvin I. Glass, Chicago, and Gordon A. Barlow, Evanston, Ill., assignors to Marvin Glass & Associates, Chicago, Ill., a partnership Filed Dec. 19, 1968, Ser. No. 785,075
Int. Cl. A63h 33/30
U.S. Cl. 46—33 11 Claims

ABSTRACT OF THE DISCLOSURE

A toy telephone including a battery operated phonograph device adapted to reproduce any selected one of a plurality of discrete messages on a record. The simulated dial is connected with an indexing means for positioning a stylus on the record in accordance with the number dialed. The turntable is movable vertically from an upper position of operative engagement between the record and stylus and a lower position wherein the motor driven rotation of the turntable effects ringing of a bell. The electrical control circuit for the motor includes a time delay switch which is effective to provide a lapse of time after a main switch is turned on and/or the simulated receiver is replaced in its cradle, to thereby provide the fun of an automatic return call for the child. Further, the recorded messages are arranged in related pairs of messages, so that the return call message is related to the preceding message.

The invention relates generally to toy telephones provided with phonograph devices for simulating a real conversation between the child and an imaginary playmate. More specifically, however, the present invention includes novel apparatus whereby the telephone rings automatically, after a time delay, upon replacing the receiver in its cradle, and then effects reproduction of a message related to the previous message, so that there is an opportunity for a more realistic play on the part of the child using the telephone.

FIG. 4 is a sectional view taken along the line 4—4 in FIG. 2;

FIG. 5 is a sectional view taken along the line 5—5 in FIG. 2;

Figures 1, 2, 3:
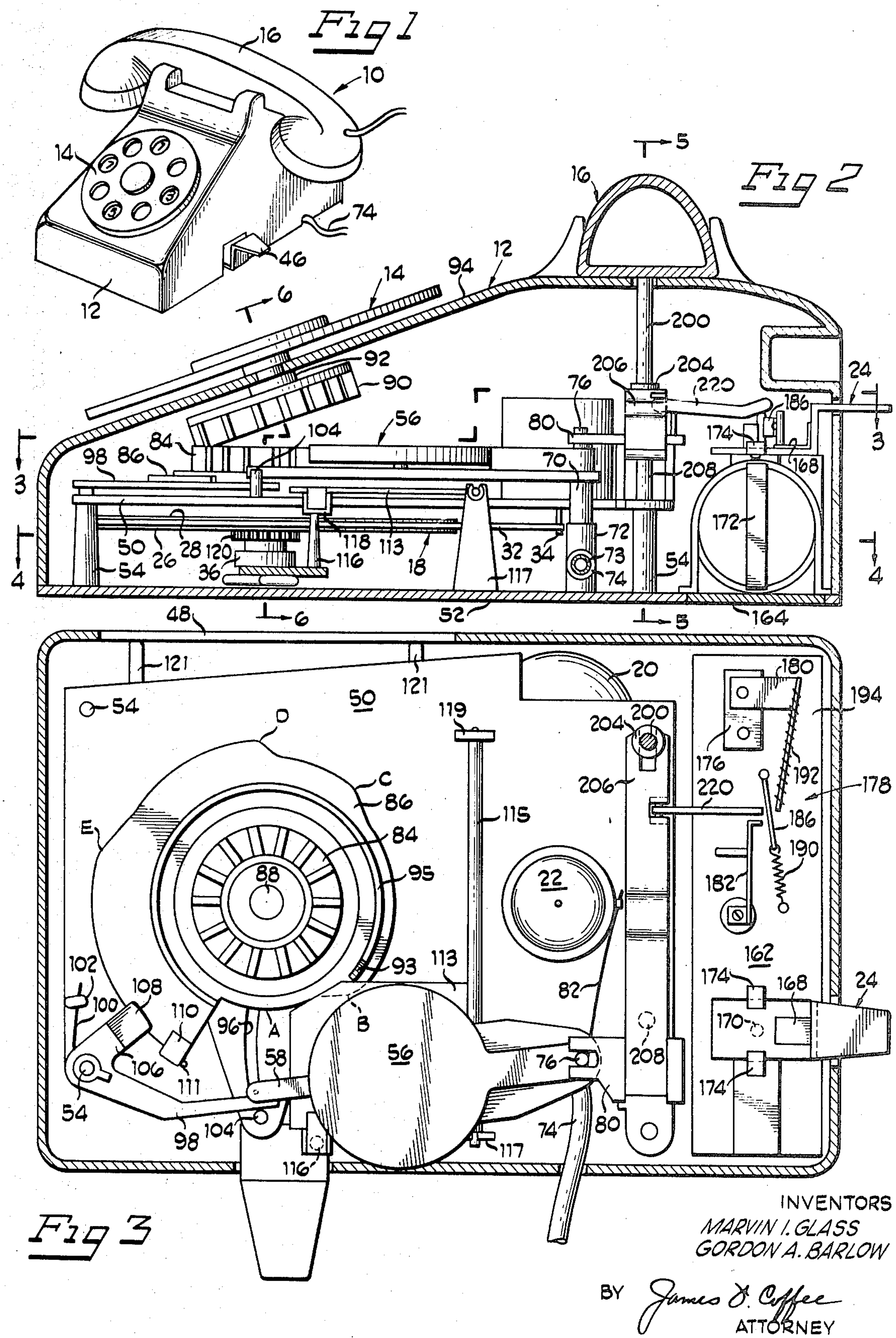
FIG. 1 is a perspective view of the toy telephone embodying the invention.
FIG. 2 is an enlarged side elevational view of the toy telephone, with the near wall removed in order to illustrate the internal mechanism.
FIG. 3 is a sectional view taken generally along the line 3—3 in FIG. 2, with parts omitted and in section.

The toy telephone 10 illustrated in the drawings simulates a conventional desk type telephone and includes a housing 12, a dial 14, and a receiver-transmitter 16. The housing 12 contains a phonograph device 18, a bell 20, and a battery powered motor 22 for activating the phonograph device and the bell mechanism. When the telephone is conditioned for use, by placing an external switch 24, in its "on" position, the telephone will automatically ring after a predetermined lapse of time. The ringing will continue until the receiver 16 is removed from its cradle. The latter action will stop the bell ringing and initiate operation of the phonograph device 18 to reproduce a message which will be heard through the receiver portion of the receiver-transmitter 16. At the end of the message, the replacement of the receiver in its cradle will deactivate the phonograph device and condition the bell ringing mechanism for operation after a predetermined lapse of time. Further, the telephone dial 14 is cooperatively associated with the phonograph device, so that a particular one of the plurality of messages on the phonograph record can be heard by dialing a particular number.

A description of the mechanism which makes possible the above described operations will now be given with reference first to FIGS. 2 and 3 of the drawings. As seen in these figures, the phonograph device 18 within the housing 12 includes a rotatable turntable 26 having a record 28 removably positioned on the upped surface of the turntable. The record is provided with a single spiral sound track having a plurality of messages recorded therein, with the messages being separated by blank portions in the groove. The edge of the turntable 26 is provided with a circumferential groove 30 receiving an endless belt 32, preferably of rubber or the like, which is also disposed around the drive shaft 34 of the electrical motor 32 and tensioned to assure a driving connection between the shaft 34 and the turntable 26. As seen also in FIG. 6, the turntable 26 is supported by a cylindrical part 36 fixed to the bottom of the housing 12 and including a vertically movable spindle 38 which extends upwardly through a central opening in the turntable 26 and record 28. The lower end of spindle 38 is connected, through a slot 40 in the cylindrical housing, with the inner end of a lever 42. The lever 42 is pivoted intermediate its ends on a pair of notched ribs 44 (FIG. 4) fixed to the base of the housing, and the other end of the lever 42 projects outwardly of the housing and is provided with a handle portion 46. By elevating the handle portion 46 of the lever, the spindle 38 is depressed to a position beneath the record 28 to permit sliding movement of the record out of the housing through a side opening 48 (FIG. 6) simply by tipping the housing in the direction of the side opening. Similarly, a new record can be inserted through the side opening 48 and positioned on the turntable by permitting the handle 46 to drop downwardly after the record is inserted to thereby elevate the spindle to a position extending through the central opening in the record.

Figures 7, 8, 9:
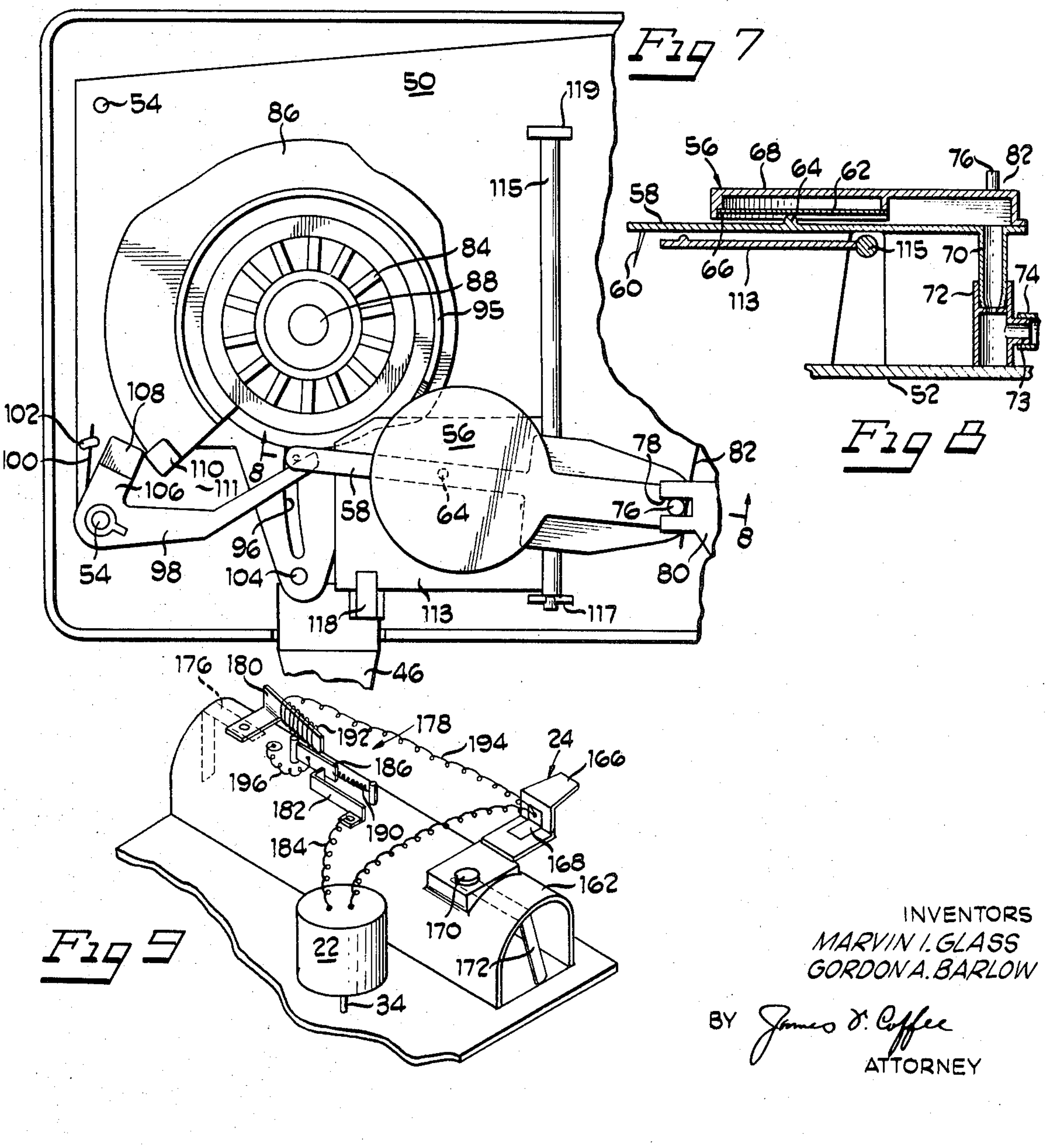
FIG. 7 is a fragmentary view of the mechanism seen in FIG. 3, with certain of the parts in different positions.
FIG. 8 is a sectional view taken along the line 8—8 in FIG. 7, with parts omitted and broken away.
FIG. 9 is a fragmentary perspective view including the battery power unit, motor and bimetallic switch; illustrating the electrical connections therebetween.

Overlying the turntable 26 (FIGS. 2 and 3) is a large plate 50 which is fixed in position and supported on the base 52 of the housing by means of four vertically extending posts 54 disposed generally at the four corners of the plate. Plate 50 provides means for supporting and locating the tone arm assembly 56. The tone arm assembly (see also FIG. 8) comprises a pivotally mounted tone arm 58 having a stylus or needle 60 at its free end and an acoustical amplifier including a diaphragm 62 engaging a projection 64 on the tone arm. The diaphragm 62 is supported at its periphery on a ledge 66 formed within the circular housing 68 overlying the tone arm. Housing 68 includes a relatively narrow portion extending rearwardly along the tone arm to the pivot mounting for the tone arm assembly, and housing 68 provides an essentially closed chamber placing the diaphragm portion 62 in communication with a hollow cylindrical pivot arm 70 for the tone arm. Cylindrical pivot 70 is formed with a generally hemispherical end portion adapted to provide a loose pivot mounting with a relatively larger hemispherical socket portion at the upper end of a cylindrical post 72. The central bores in pivot 70 and post 72 are in communication with one another and with a bore formed in a transversely extending part 73 of post 72 which affords connection with a hollow tube 74 providing the "wire" extending to the telephone receiver 16. Consequently, the vibrations of the stylus 60, as it travels through the groove on the record, are transmitted through the tone arm 58 to the diaphragm 62, where such vibrations are amplified and transmitted through the hollow pivot support 70, 72 and the tube 74 to the receiver 16. Further support for the tone arm assembly is provided by a pin 76 extending upwardly from the top of housing 68 and disposed within a slot 78 formed on a bracket 80 fixed to the plate member 50. Pin 76 is biased in the direction of the turntable 26, to thereby provide a predetermined amount of pressure of the stylus 60 on the record 28, by means of a spring member 82 (FIG. 3) having its free end disposed between the upper surface of the housing 68 and the bracket 80 and having its opposite end suitably fixed as to the mounting for motor 22.

In order to provide for proper and selective indexing of the stylus 60 with respect to the record 28, there is provided indexing means located on top of the plate 50. With reference particularly to FIGS. 2, 3, 6 and 7, the indexing mechanism comprises an integral gear 84 and cam 86 which is mounted for rotation on a vertically extending post 88 fixed to plate 50. The gear portion 84 extends upwardly in position for engagement with complementary gear member 90 fixed for rotation with the telephone dial 14. A shaft 92 joins the gear 84 and dial 90 at their centers, and the shaft 92 is rotatably mounted in the upper wall 94 of the telephone housing. The cam portion 86 is in the form of a plate member having an irregular edge providing a series of lobes for locating the stylus 60 with respect to each of the separate messages recorded on the record. In addition, there is a tone arm lift cam 95 adjacent the outer portion of cam 86, in the form of a ridge extending upwardly from the cam plate and being generally circular. It will be noted that the edge portion of cam plate 86 has an irregular, diminishing radius with respect to its axis of rotation, so as to thereby place the stylus-locating cam lobes, indicated at A, B, C, D and E, sequentially closer to the axis of rotation of the gear 84 and cam 86.

Figures 11, 12, 13, 14:
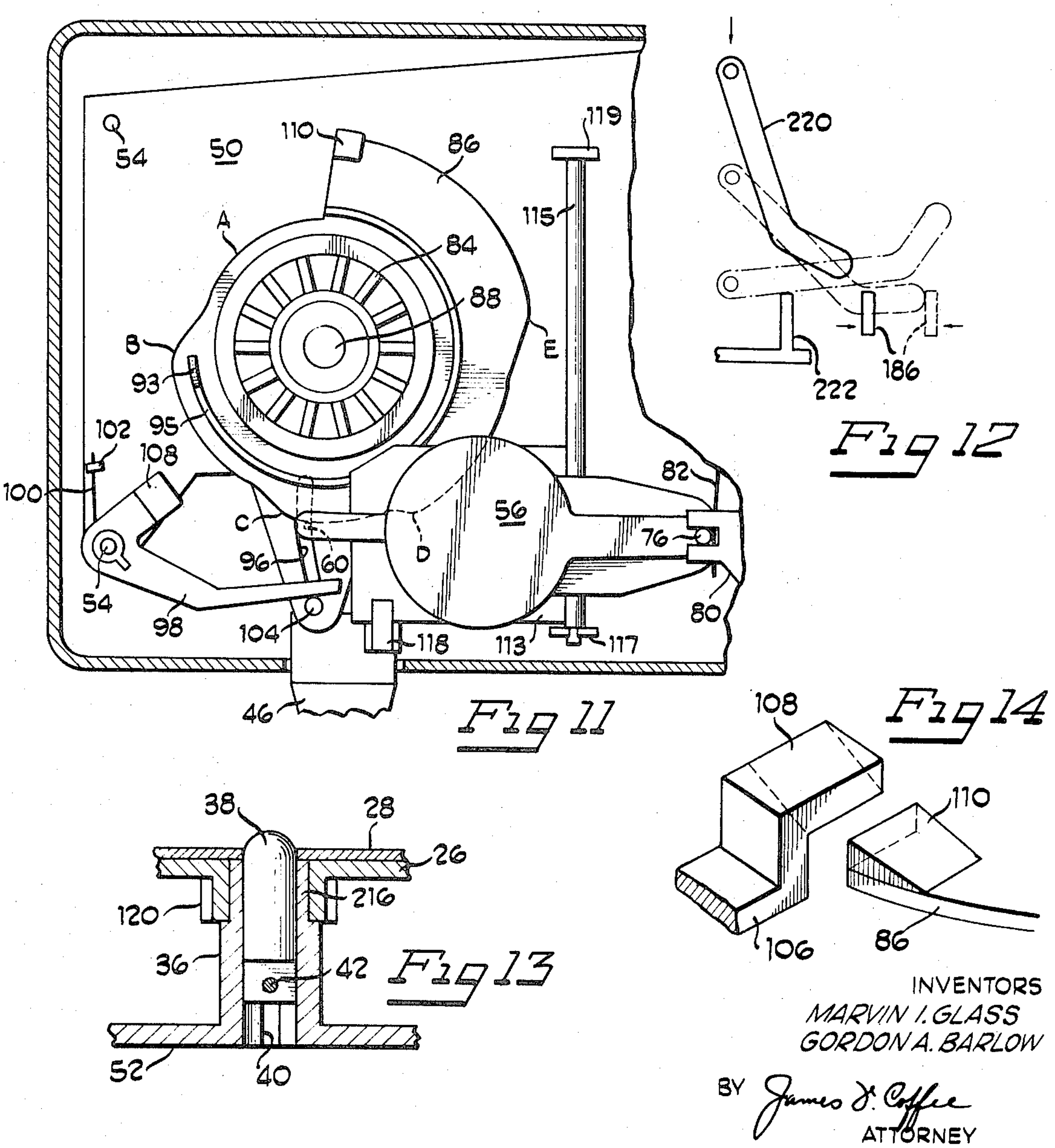
FIG. 11 is a view similar to FIG. 7, with certain parts in a different position.
FIG. 12 is a schematic illustration of the operation of switch mechanism seen in FIGS. 2 and 3.
FIG. 13 is an enlarged vertical cross-section of the turntable spindle portion.
FIG. 14 is an enlarged fragmentary perspective view of parts seen in FIGS. 3 and 7.

The edge portion of the supporting plate member 50 adjacent the tone arm 58 is provided with an arcuate slot 96 for guidedly receiving the stylus 60. Further, there is provided a lever arm 98 having its free end in position for engagement with the stylus 60 and operable to move the stylus and tone arm toward the center of the cam plate 86, and, therefore, toward the center of the underlying record 28. This lever arm 98 is pivotally mounted on the adjacent post 54 (FIG. 3) and is biased clockwise by means of a spring 100 coiled around and fixed at one end to the post and fixed at its free end to a stud 102 on plate 50. A vertically projecting post 104 adjacent to the end of the arcuate slot 96 limits the movement of the lever arm 98 clockwise. The lever arm 98 is provided with a short crank arm 106 having a raised portion 108 provided with an inclined bottom surface in position to be engaged by an inclined raised portion 110 on the cam 86 (see also FIG. 14). As the cam plate 86 is rotated clockwise, through operation of the dial 14, the inclined cam 110 thereon strikes against the crank arm portion 108 and rotates the lever 98 counterclockwise, so as to move the stylus 60 and tone arm 58 to its innermost position in slot 96 engaging edge section 8 of the cam plate 86. As the cam plate 86 continues rotation, the cam 110 moves beyond the crank arm portion 108 and releases the lever 98 to move clockwise into its biased position against the post 104. Continued rotation of the cam plate 86 further positions the stylus 60 and tone arm 58 as the stylus is engaged by one or more of the cam lobes B—E. In this respect, it should be noted that the initial placement of the tone arm 58 at the innermost edge of the slot 96 also places the end of a tone arm lifting plate 113 in a position of engagement by an inclined leading edge portion 93 of the circular rim or projection 95 adjacent the edge of the cam plate 86. Consequently, the plate 113 and the overlying tone arm 58 are raised through rotation of rim 94 and maintained in an elevated position until such time as the cam plate rotation is reversed by releasing the dial 14 and permitting the dial and cam 86 to return to their original positions. In this respect, it is to be noted that a coil spring 112 (FIG. 6) within the hub portion of the dial biases the latter in a particular position, and the rotating of the dial clockwise winds spring 112, so that release of the dial causes it to return counterclockwise to its initial position as determined by a stop 111 (FIG. 3) on plate 50.

As seen particularly in FIGS. 2, 3, 7, and 8, the tone arm lifting plate 113 comprises a generally flat member fixed along one side to a shaft 115 having its opposite ends rotatably journaled in a pair of aligned bearing supports 117, 119 projecting upwardly from the telephone housing base 52 and plate 50, respectively. Plate 113 is normally maintained in a generally horizontal position of support for the overlying tone arm 58 by means of a vertical post 116 (FIG. 2) on lever 46 which engages a depression 118 in plate 113. When lever 46 is raised, post 116 raises plate 113 and elevates the tone arm assembly, while depressing spindle 38 to permit removal or insertion of a record through slot 48 in the side of the telephone. In the latter respect, it will be noted from FIGS. 3 and 6 that a pair of ribs 121 are disposed within the housing adjacent opening 48 to guide the movement of a record relative to the turntable.

Figure 6:
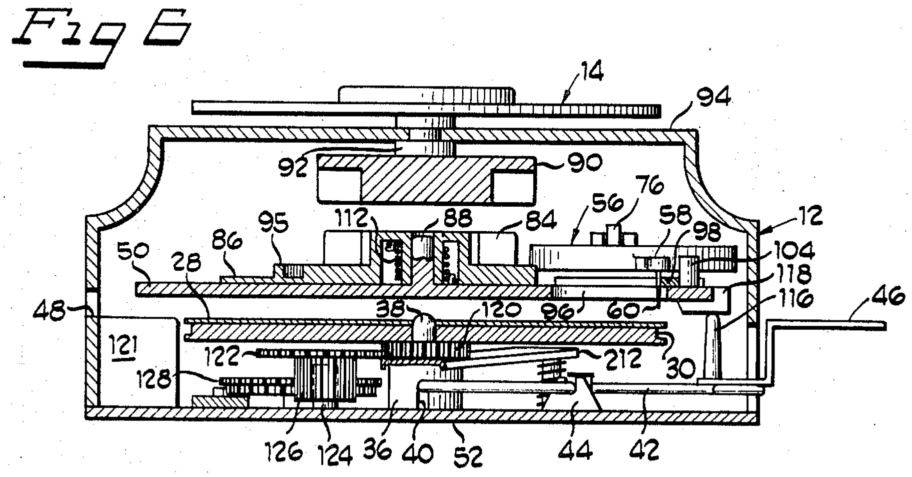
FIG. 6 is a sectional view taken along the line 6—6 in FIG. 2.
Figure 10:
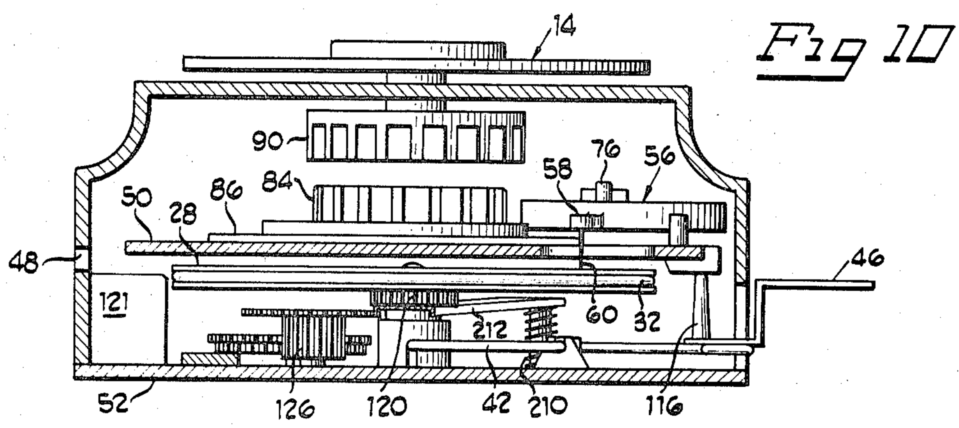
FIG. 10 is a sectional view similar to FIG. 6, with certain parts in a different position.

With reference particularly to FIGS. 4 and 6, it will be seen that a large gear 120 fixed to the underside of the turntable 26 is engageable with a series of gears for operating the bell-ringing mechanism. As indicated previously, the turntable is movable vertically between a position of engagement between the record 28 and stylus 60 (FIG. 10) and a lowered position (FIG. 6) wherein the record is free of the stylus. In the latter position, the large gear 120 engages a gear 122 (FIG. 6) which is rotatably mounted on a stub shaft 124 projecting upwardly from the bottom 52 of the housing. Also fixed to gear 122 is a pinion gear 126 which engages an intermediate gear 128 (FIG. 4) rotatably mounted on a second shaft 130. Fixed to gear 128 is a pinion gear 132 disposed in meshing engagement with one of a pair of vertically spaced-apart gears 134, 136 carried by a shaft 138. The lowermost gear 136 of this pair of gears includes teeth along approximately one-half of its circumference which are engageable with a lug 140 extending upwardly from a lever 142. The lever 142 is pivotally mounted at one end on a post 144 and is biased for counterclockwise movement by a spring member 146. The free end of the lever 142 has a pair of spaced-apart pins 148 thereon and one end of a bell crank 150 is positioned between these pins. The bell crank 150 is pivotally mounted on a pin 152 or rivet and has its free end 154 in position for striking engagement with bell 20. Thus, as the turntable 26 is rotated in its lowermost position, the gears 120 through 136 are also rotated. As the toothed portion of gear 136 sequentially strikes the pin 140, the lever arm 142 is oscillated to effect repeated striking motion of the hammer 154 against the bell 20. As the smooth or nontoothed portion of gear 136 passes the pin 140, there is, of course, a period of silence for the bell.

The electrical circuit for controlling the operation of the drive motor 22 includes a pair of batteries 160 disposed in a battery case 162 with the housing 12 and supported on the lower wall 52 with a removable bottom plate 164 affording access to case 162 for replacement of the batteries. The upper wall of case 162 (FIGS. 3, 5 and 9) supports switch mechanism for controlling the drive motor 22, including an off-on switch 24 having a portion projecting outwardly of the rear wall of the telephone housing. The off-on switch 24 comprises an angularly bent member including a metal contact portion 168 which extends below the member in position for engagement with a button 170 provided on a batter clip 172 secured to the battery housing. The off-on switch member 24 is retained in position for sliding movement relative to the battery housing by a pair of lugs 174 formed on the top of the battery housing. The opposite end of the battery housing 162 also includes a metal clip member 176 electrically connected with a bimetallic switch means 178. More particularly, switch means 178, comprises a first metallic member 180 connected to the battery contact 176, and a second metallic member 182 fixed to the upper wall of the battery housing and connected to the motor 22 by a wire 184. The free ends of contact members 180, 182 are spaced-apart and a spring-biased movable contact assembly 186 is disposed therebetween. The movable contact assembly provides a toggle or over-center type switch comprising a pivotally supported metal portion 186 connected by a spring 190 to a post and arranged normally in closely spaced relation with the free end of member 180. Contact member 180 is a heat-deformable metal piece which includes a wire coil 192 surrounding the deformable metal and connected with the off-on switch contact 168 by a wire 194. A third wire 196 connects the movable switch element 186 with battery contact 176.

As the off-on switch 166 is moved inwardly to its "on" position, the battery circuit including switch 166 and contact 168 is closed through wire 194 and the coil 192 surrounding the deformable metal contact 180 provides sufficient heat to ultimately cause the free portion of the contact to bend in the direction of the toggle member 186 and force the latter into contact with the contact member 182 and thereby close the circuit including wire 184, to the motor 22. Assuming that the telephone receiver 16 is resting in its cradle on housing 12, turntable 26 will be in its lowered position (FIG. 6) with gear 120 engaging gear 122. The operation of motor 22 drives turntable 26 and gear 120 rotates to drive the mechanism described above for operation of bell 20. The bell will ring intermittently until receiver 16 is lifted from its cradle.

As receiver 16 is lifted from its cradle, the bell 20 ceases to ring and the phonograph mechanism is activated as follows. Underlying the cradle and movable through an opening in housing 12 is a vertically extending rod 200 (FIGS. 2 and 5) having its lower end supported in a cylindrical sleeve 202 fixed to plate 50. An intermediate portion of the rod 200 is provided with a collar 204 engaged by the bifurcated end of a lever 206 which has its opposite end pivotally connected with a portion of bracket 80. Lever 206 is normally biased upwardly by engagement therewith of an underlying, vertically extending pin 208 which is also urged upwardly by a coil spring 210. Pin 208 is fixed to a generally horizontal arm 212 which extends essentially the length of housing 12 to a position of pivotal support on a lug 214 or the like extending upwardly from the bottom wall 52 of the housing. An intermediate portion of lever 212 overlies turntable support 36 or a position below gear 120 and includes a arcular opening to accommodate passage therethrough of spindle 38 and a sleeve portion 216 of support 36 which slidably receives the spindle. Consequently, vertical motion of lever 212 results in vertical movement of the turntable 26 relative to its support 36.

Consequently, as the receiver 16 is lifted to free pin 200 the latter is elevated under the biasing action of spring 210. At the same time, the lever 212 is pivoted upwardly about its support 214 and such upward movement raises gear 120 and turntable 26 to the position shown in FIG. 10, wherein gear 120 is free of the bell drive gear 122 and the record 28 is in engagement with needle 60. The message portion of the record underlying needle 60 is then reproduced and transmitted to receiver 16. When the receiver 16 is replaced in its cradle, pin 200 is depressed and thereby effect a lowering of lever 212 to move the turntable downwardly and disengage the record 28 from needle 60. Such movement also returns gear 120 to a position of meshing engagement with gear 122, but it also moves toggle switch 186 (FIG. 3) back to a position wherein contact 186 is adjacent but not in contact with switch element 180. The movement of toggle 186 is accomplished by a bent arm 220 pivotally carried on the lever 206 and movable into engagement with switch element 186 to return the latter to the normal position seen in FIG. 3 as the lever 206 is moved downwardly. As seen particularly in FIG. 12, the complete lowering of lever 206 causes arm 220 to strike a transverse rib 222 and elevate the free end of the arm out of engagement with 186 after the latter has been moved the desired distance.

In summary, the operation of the toy telephone is as follows. With the external control switch 24 in its extended "OFF" position and the receiver 16 in its cradle, the phonograph device and drive mechanism is as shown particularly in FIGS. 3 and 6, with turntable 26 lowered and driving gear 120 in meshing engagement, with the adjoining gear 122. When the main switch 24 is moved to its "on" position, there is a flow of current from the battery to the bimetallic switch 178. As the contact portion 180 of the latter is heated, it curves into a position of engagement with the movable blade 186 and pushes the latter against the contact 182 to thereby close the circuit to the drive motor 22. As the motor shaft rotates, it effects rotation of the turntable 26 and the main drive gear 120 to thereby effect an intermittent ringing of the bell 20. The ringing of the bell 20 will continue until the receiver 16 is lifted from its cradle. As the receiver is removed, it permits the pin 200 and the lever 20 to move upwardly in response to the biasing action of the coil spring 210 (FIG. 5). This upward movement is accompanied by an upward movement of the lever 212 underlying the turntable, so as to cause the turntable to be elevated into a position of engagement of the record by the stylus 60. This upward movement also elevates the main drive gear 120 out of its position of engagement with the gear train for the bell mechanism.

In the event that the dial 14 has not been rotated the stylus 60 will be in position at the end of the last message reproduced and will then proceed to play the succeeding message when the receiver is lifted. If the receiver is replaced in the cradle after the reproduction of a message, the toggle switch 186 will be opened to halt motor 22 and the turntable 26 will be moved to its lower position, thereby placing the drive gear 120 in driving relation with the bell-ringing mechanism. At this point current is flowing to coil 192 and, after the bimetallic switch element 180 has had an opportunity to heat sufficiently it will again move to push element 186 against contact 182 and thereby motor 22 and produce a ringing of the bell. If the receiver is then raised, the next recorded message will be heard. However, if prior to lifting the receiver the dial 14 is rotated to a particular number, the cam plate 86 and lever arm 98 will move the stylus and tone arm 58 to a position in readiness for reproducing the particular portion of the recorded message which is associated with the dialed number. The subsequent raising of the receiver will then permit the turntable and record to be elevated to a position of engagement with the stylus and the selected message will be reproduced. In the selected embodiment of the invention, the record 28 is provided with several "pairs" of related messages with the first of such messages ending in a statement to the effect that the "party" has to hang up but will call back. The child playing with the telephone then hangs up the receiver and, after a pause, the telephone bell rings automatically. Upon lifting the receiver, the child discovers that the same "party" has called again to continue the previous conversation. Consequently, it should be apparent that considerable play value is inherent in the somewhat mysterious ringing of the bell and automatic reproduction of a message when the telephone is answered by lifting the receiver.

Although shown and described with respect to particular apparatus, it will be apparent that various modifications of the described structure might be made without departing from the principles of the invention disclosed herein.

What we claim is:

1. A toy telephone comprising a housing including a phonograph device adapted to reproduce recorded sound messages, said phonograph device including a record having a plurality of discrete messages thereon, a stylus mounted for movement relative to said record, a dial mounted externally of said housing for rotation relative thereto, means within said housing connected with said dial and operable in response to rotation thereof to position said stylus on said record at a predetermined position in accordance with the amount of rotation of said dial, a turntable supporting said record, and battery operated mechanism within said housing including means drivingly connected with said turntable to effect rotation thereof.

2. A toy telephone as set forth in claim 1, wherein the stylus positioning means includes a lever which is movable in response to rotation of said dial to engage said stylus and move it to its innermost position radially of said record, and a cam plate mounted above said record for rotation in response to rotation of said dial, said cam plate having an irregular periphery including a plurality of lobes in position to engage said stylus and move it from said innermost position to any of a plurality of positions radially of said record.

3. A toy telephone as set forth in claim 2, wherein said dial is connected with said cam plate through a pair of meshing gears fixed, respectively, on said dial and cam plate for rotation therewith, a stop positioned to prevent rotation of said dial in one direction, spring means biasing said dial against said stop and effective to return said dial to said stop after manual rotation of said dial in its other direction of rotation, and said lobes on said cam plate are arranged sequentially at progressively greater distances from the axis of said cam plate so that said stylus is positioned progressively nearer to the periphery of said record as the length of the arc of movement of said dial is increased.

4. A toy telephone as set forth in claim 3, wherein said cam plate also includes means for lifting said stylus upwardly from said record during rotation of said dial and for releasing said stylus for downward movement and engagement with said record upon the return movement of said dial to its stop position.

5. A toy telephone comprising a housing mounting a rotatable dial and including a cradle portion removably supporting a simulated telephone receiver, a phonograph device within said housing including a record having a plurality of discrete messages thereon, a tone arm pivotally mounted in said housing adjacent one end and including a stylus at its free end and an amplifying diaphragm at an intermediate portion of the tone arm, conduit means leading from said diaphragm to said receiver, means for selectively positioning said stylus at any one of a plurality of predetermined positions radially of said record, said last means being connected with said dial and operable in response to rotation of said dial, a rotatable turntable in said housing supporting said record, and a battery operated motor connected in driving relation to said turntable.

6. A toy telephone as set forth in claim 5, wherein said turntable is mounted for vertical movement between an upper position providing for operative engagement between said stylus and record and a lower position, a bell ringing mechanism within said housing including gear drive means, a drive gear fixed to said turntable and engageable in driving relation with said bell ringing gear drive means when said turntable is in its lower position, and means for effecting vertical movement of said turntable including an element movably supported in said housing and responsive to the positioning of said receiver relative to its cradle portion to move said turntable vertically.

7. A toy telephone comprising a housing including a phonograph device adapted to reproduce recorded sound messages, said phonograph device comprising means provided with a plurality of discrete recorded sound messages thereon, a sound pick-up unit, means in said housing providing for engagement of said pick-up unit with said record means and for relative movement therebetween to effect reproduction of the recorded messages, said latter means including a battery operated electric motor carried in said housing, and an electrical control circuit for said motor including a first on-off switch and a time delay switch device in series with said on-off switch and connected with said motor, whereby operation of said motor and said phonograph device is delayed for a predetermined period after placing said first switch in the "on" position.

8. A toy telephone as set forth in claim 7, wherein said recorded message means is a record mounted on a turntable for rotation therewith, and including drive means connecting said motor with said turntable to effect rotation thereof when said motor is actuated.

9. A toy telephone as set forth in claim 8, including means mounting said turntable for vertical movement from a position of engagement between said record and said pick-up unit and a lowered position out of the path of said pick-up unit, a drive gear fixed to said turntable for movement therewith, a bell in said housing, bell ringing mechanism in said housing including a gear positioned for meshing engagement by said drive gear when said turntable is in its lowered position, a simulated telephone receiver removably mounted on a cradle portion on said housing, and means for effecting vertical movement of said turntable between said lowered position and said position of engagement between said record and pick-up unit including means responsive to the positioning of said receiver on its cradle, said last mentioned means providing for positioning of said turntable in its lowered position when said receiver is on said cradle and for elevation of said turntable to a position affording engagement of the pick-up unit with the record when said receiver is lifted from its cradle portion.

10. A toy telephone as set forth in claim 9, wherein said sound pick-up unit comprises a tone arm pivotally mounted in said housing and including stylus in position for engagement with said record, a spring biased dial rotatably mounted on the outside of said housing, and stylus indexing means within said housing operably connected with said dial and effective to position said stylus to a selected position on said record as determined by the amount of rotation of said dial and so as to reproduce a selected one of said messages.

11. A toy telephone as set forth in claim 10, wherein said discrete messages are arranged on said record in pairs of sequential, related messages, said indexing means positions said stylus at the first of any selected pair of sequential messages upon rotation of said dial, and including means for opening said time delay switch to stop said motor when said receiver is replaced in its cradle, whereby the closing of said on-off switch with the receiver in its cradle is followed after a predetermined time delay by the closing of said time delay switch to thereby operate the motor and ring said bell, the removal of said receiver from its cradle terminates said ringing of the bell and places the stylus on the record to reproduce a message thereon, and whereby the replacement of said receiver in its cradle after reproduction of said message shuts off said motor and lowers said turntable, whereupon the time delay switch is subsequently closed to start said motor and ring said bell and thereafter the lifting of said receiver from its cradle causes the turntable to again be raised to a position of engagement with said stylus for reproduction of the second one of said pair of messages.

References Cited

UNITED STATES PATENTS

| | | | |
|---|---|---|---|
| 2,634,647 | 4/1953 | Loeffler et al. | 46—33 |
| 3,422,566 | 1/1969 | Wolf | 46—33 |

ROBERT PESHOCK, Primary Examiner